Feb. 29, 1944.     H. O. WILLIAMS ET AL     2,342,913
DEEP WELL SCREEN
Original Filed April 15, 1940    2 Sheets-Sheet 1
FIG. I.
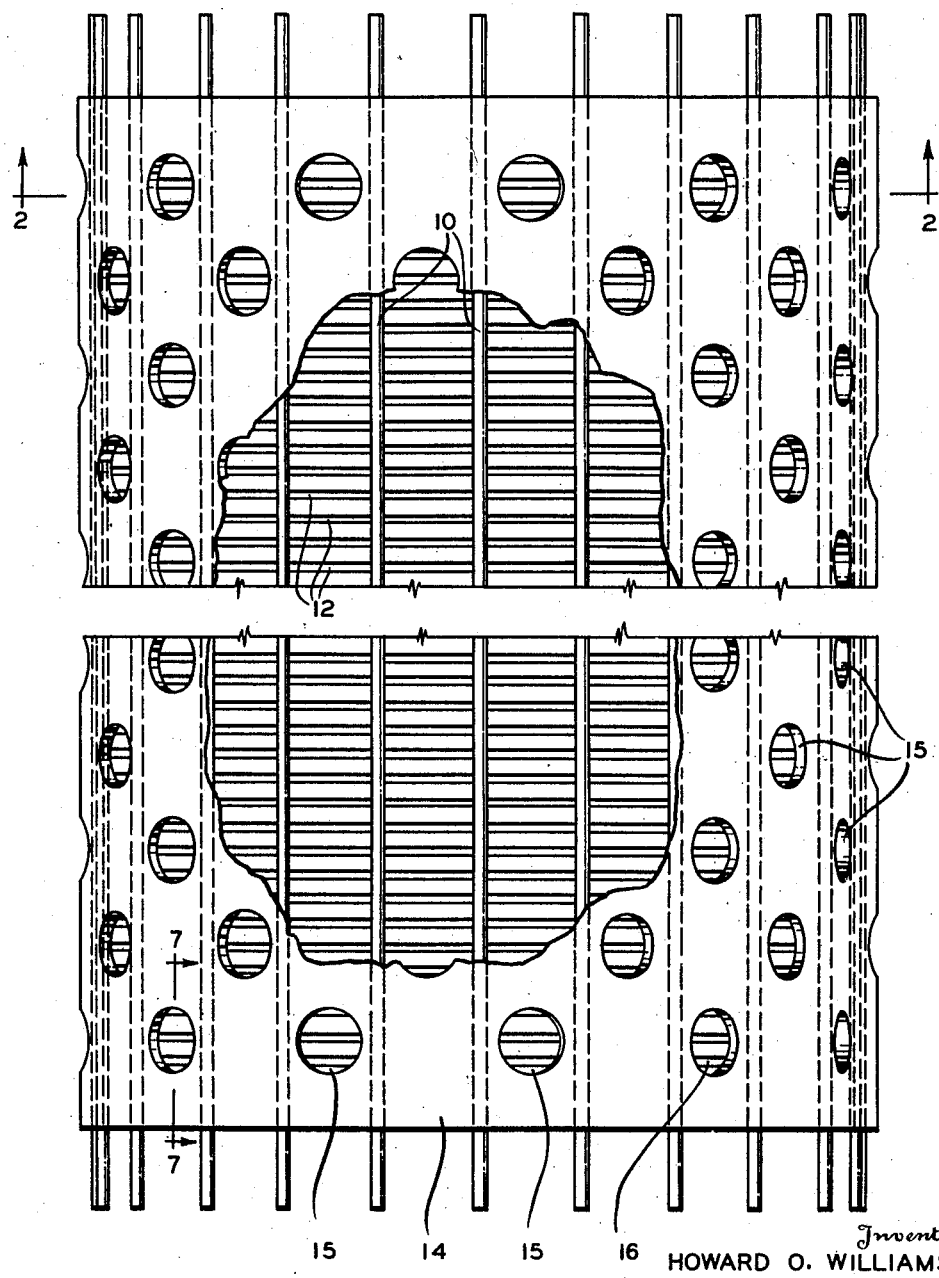
HOWARD O. WILLIAMS
ALBERT A. JENS

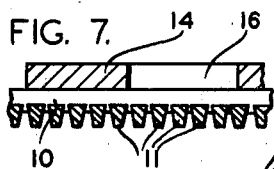
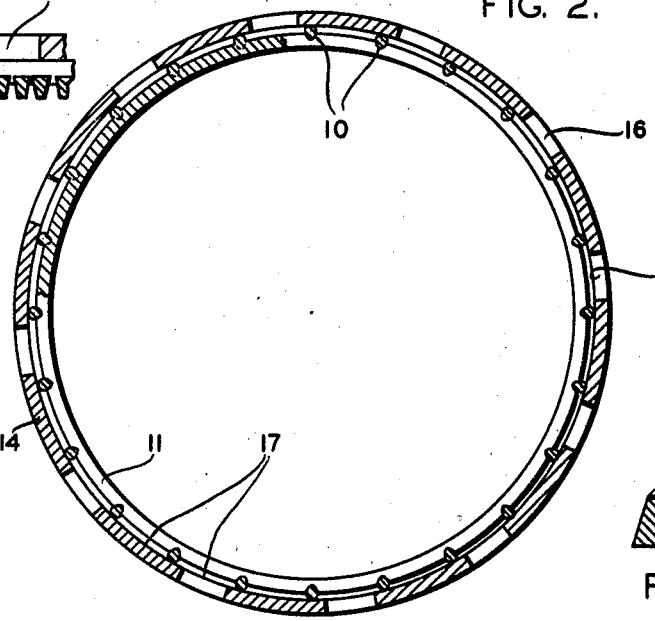
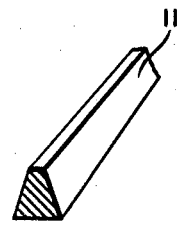
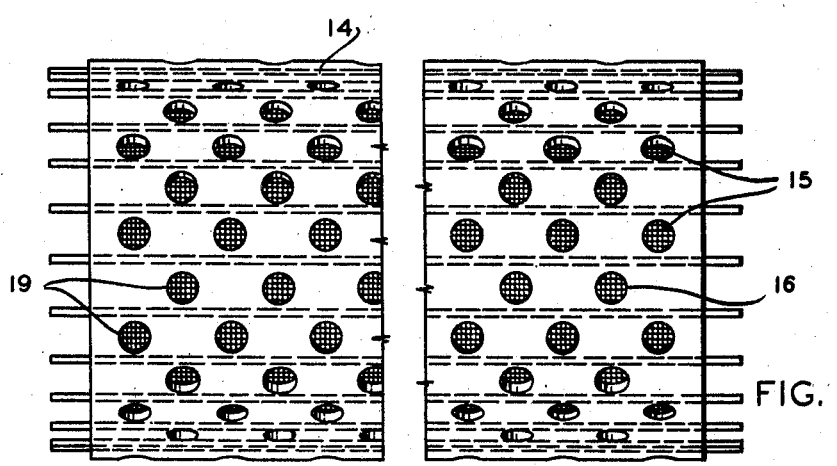
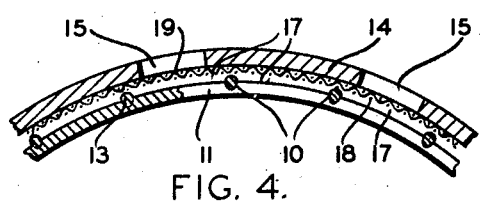

Patented Feb. 29, 1944

2,342,913

UNITED STATES PATENT OFFICE 2,342,913

DEEP WELL SCREEN

Howard O. Williams, Minneapolis, and Albert A. Jens, St. Paul, Minn., assignors to Edward E. Johnson, Incorporated, St. Paul, Minn.

Original application April 15, 1940, Serial No. 329,750, which is a division of application Serial No. 222,410, August 1, 1938. Divided and this application September 18, 1942, Serial No. 459,062

1 Claim. (Cl. 166—5)

Our invention relates to deep well screens, and has for its object to provide a very strong well screen with no external parts that might be displaced or damaged during setting, and with all of the elements making up the screening surface located on the inside of a perforated pipe base and separated from the inside of the pipe base by suitable supporting elements which are spaced apart to give longitudinal drainage channels to the screening surface proper and which are so held against the pipe base as to be substantially integral therewith.

In the setting of well screens in deep wells, particularly such wells as are put down for obtaining oil, the outer part of the screen element is subjected to very great stresses. This has presented a problem in the manufacture of a well screen having a screening surface sufficiently fine to prevent infiltration of fine sands and yet which is sturdy enough to resist the above-noted severe strains. The most effective resisting element for a well screen subject to such strains is an integral pipe having its walls of substantial thickness and provided with suitable perforations. This can be set in very deep wells and against the severe strains which are entailed in putting it down with little likelihood of serious deformation and substantially none of its destruction. But the perforations or holes in this pipe base cannot be provided which in and of themselves provide a suitable screen surface, and difficulties have been encountered in finding suitable ways of providing a fine screening surface over these holes.

It is a principal object of our invention, therefore, to produce a well screen having an unbroken perforated pipe base forming the outer wall of the screen, in combination with a screening surface comprising a multiplicity of spaced longitudinal supporting ribs having a wrapping wire laid helically on the inside of said ribs and welded thereto at every crossing point, adjacent helical coils of said wire being spaced the proper distance to make sufficiently narrow drainage slots for permitting the oil or other fluid to pass through and cutting out even very fine sand, the outer pipe base being made substantially integral with the longitudinal supports and said supports forming longitudinal channels opening to the perforations in the pipe base on the outside and to the strainer surface formed by helical slots on their inside.

It is a further object of our invention to provide a well screen having an outer pipe base wall with sets of apertures extending in longitudinal and circumferential rows about the same and being successively staggered individually from row to row in each direction and having a prefabricated screen formed with a series of longitudinal elements spaced apart so that successive pairs thereof embrace longitudinal rows of said openings and contact the inner walls of the pipe base to form longitudinal drainage channels communicating with said rows of holes with a screening surface formed on the inside of said longitudinal members by welding a helically wound wire to the rods at every crossing point thereof with the successive helical coils of the wire spaced to form drainage slots.

It is a further object of our invention to provide a well screen for use in very fine sands wherein there is an outer pipe base wall with sets of apertures extending in longitudinal and circumferential rows, in combination with a prefabricated screen formed with a series of longitudinal elements spaced apart so that successive pairs thereof are placed outside of longitudinal rows of said openings, and a mesh screen cylinder overlying the longitudinal elements and gripped by said longitudinal elements against the inner surface of the pipe base, all held to be substantially integral, thus forming a mesh screen over the holes through the pipe base by which said holes communicate with longitudinal channels leading to the screening surface formed by helical coils of wire welded to the longitudinal members at every crossing point thereof.

This application is a division of application Serial Number 329,750, filed April 15, 1940, which is a division of Serial Number 222,410 filed August 1, 1938.

The full objects and advantages of our invention will appear in the appended specification, and the novel features by which the valuable and advantageous results above enumerated are secured will be particularly pointed out in the claim.

In the drawings illustrating an application of our invention in one form—

Fig. 1 is a vertical elevation view of a well screen embodying our invention with some parts broken away to show the internal construction of the screen.

Fig. 2 is a transverse sectional view taken on line 2—2 of Fig. 1.

Fig. 3 is a side elevation or plan view of a well screen embodying our invention in a modified form.

Fig. 4 is a transverse sectional view of a part of the well screen shown in Fig. 3.

Fig. 5 is a perspective part sectional view showing the cross-sectional shape of the longitudinal supporting members.

Fig. 6 is a similar view showing the cross-sectional shape of the helically wound wire.

Fig. 7 is a longitudinal sectional fragmentary view taken on line 7—7 of Fig. 1 viewed in the direction of the arrows.

In the formation of our screen a series of longitudinal rods or wires 10 of the cross-sectional shape shown in Fig. 5 are held in one plane to outline cylinders with their outer and inner limits, and when so held a wire 11 having a cross-sectional shape, indicated in Fig. 7, is laid helically upon the inner limits of the rods 10, the several coils of the helical being spaced apart so as to produce narrow drainage slots as indicated at 12 in Fig. 1. When so laid and so spaced the wire 11 has its broad face sunk into and welded to the narrowed edge of the rod 10 at every crossing point thereof so that the wire and rods are merged together and made integral, as indicated at 13 in Figs. 2 and 4. The result is a well screen arrangement wherein the supporting rods are on the outside of the strainer surface performed by the helical coils and the slots formed by adjacent pairs of said helical coils expanded inwardly and away from the supporting rods.

This structure, which comprises a cellular cylindrical fabricated screen, has applied to the outer and broader limits of the longitudinal rods a pipe base 14. This pipe base is provided with longitudinal and circumferential rows of perforations or round holes 15 and 16, which extend in parallel relation and are relatively staggered, and which provide between the several pairs of longitudinal rows uninterrupted stretches of unperforated metal. As clearly shown the pipe base is applied to the screen cylinder so that the outer and broader limits of the rods will contact the inner surface of the pipe base along these unperforated stretches of metal, with a row of perforations 15 and a staggered row of perforations 16 extending along the sides of the rods 10. The pipe base 14 is heat shrunk upon the rods 10. Since these rods are welded to all the helical coils of the strainer surface and hence are held as a cellular structure against any substantial displacement, the pipe base so shrunk upon the rods will be made substantially integral therewith. This arrangement leaves a series of longitudinal channels 17 running between the inner wall of the pipe base 14 and the outer narrowed limits of the strainer slots 12. These channels therefore directly underlie rows of holes 15 or 16 in the pipe base and furnish a very large strainer surface in full communication with the pipe base holes.

A form of the invention shown in Figs. 3 and 4 provides a cylinder 18 of relatively fine mesh material which is applied to the outer limits of the rods 10 in the form of a complete cylinder and which is bound upon the rods by the shrinking of the pipe base 14 thereon. This provides a firmly held mesh surface over all of holes 15 and 16, as indicated at 19 in Figs. 3 and 4. Hence the holes 15 and 16 open into channel 17 through the mesh covering 19. Such a screen has high utility in deep oil sands of a very fine grain.

The advantages of our invention will be apparent from the foregoing description thereof. The solid cylindrical pipe base which forms the outer portion of the well screen is well adapted to resist severe strains met with in sinking the well screen into great depths, as in deep oil wells. The rigidity of the entire structure is further increased by the fact that the screen cylinder formed of integrally united longitudinal and helical elements, which constitute in fact a very strong cellular structure, is substantially integrated with the outside pipe base, greatly reenforcing the pipe base itself against setting strains. Yet, by reason of the provision of the longitudinal channels 17 between the inner surface of the pipe base and the outer surface of the well screen proper, the latter has substantially its full drainage surface available for screening liquid passing through the holes 15 and 16 in a maximum flow.

And in the modification of Figs. 3 and 4 in addition to the normal screening action of the helical slots 12, which can be made of any desired width, there is the mesh coverings 19 of the holes in the pipe base which makes the screen adaptable for use in very fine sands.

A further advantage of our well screen is that in its entirety it can be fabricated rapidly and economically, so that notwithstanding its efficiency and high utility it costs substantially less than well screens used for the same purpose formed of built-up interlocking supporting and screen members.

We claim:

A well screen structure comprising an inner screen member formed of spaced longitudinal supporting rods and a helix of wire welded to the inside elements of the supporting rods at their inner points and forming therewith an integrated cellular screen cylinder with the longitudinal rods on the outside thereof, the wire forming said helix having a flat top engaging the rods and inwardly converging side walls, the coils thereof being spaced apart to form drainage slots with inwardly diverging side walls, and a perforated pipe base contacting and united substantially integrally with the outer limits of said rods and having rows of perforations opening into the channels formed between pairs of said rods.

HOWARD O. WILLIAMS.
ALBERT A. JENS.